Figure 1:
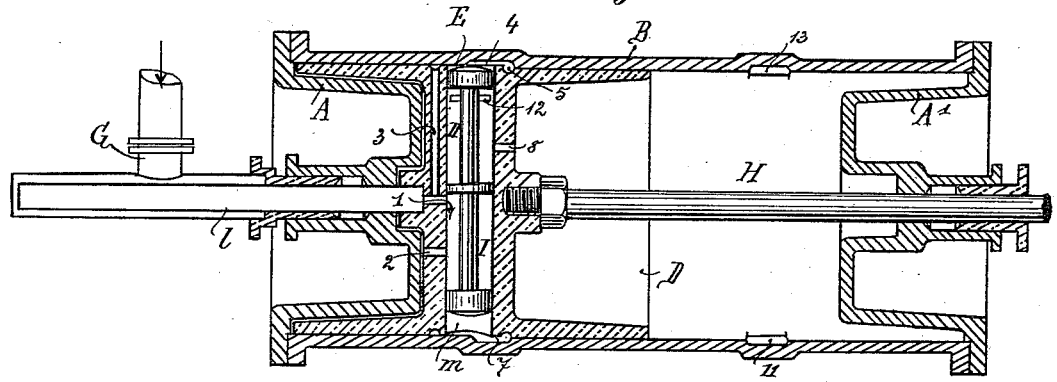
Figure 2:
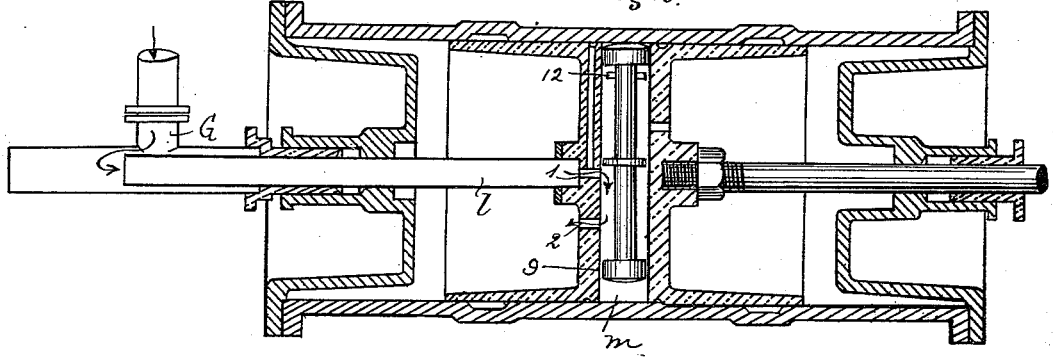

(No Model.) 6 Sheets—Sheet 1.

F. J. LAUN.
MOTOR.

No. 439,162. Patented Oct. 28, 1890.

Witnesses:
E. R. Brown
C. L. Richards

Inventor:
Franz Jakob Laun

By Richards
Attorneys.

(No Model.) F. J. LAUN. 6 Sheets—Sheet 2.
MOTOR.
No. 439,162. Patented Oct. 28, 1890.

Witnesses:
H. de Vos.
E. L. Richards

Inventor:
Franz Jakob Laun,
By Richards
Attorneys.

(No Model.)  6 Sheets—Sheet 3.
F. J. LAUN.
MOTOR.
No. 439,162.  Patented Oct. 28, 1890.
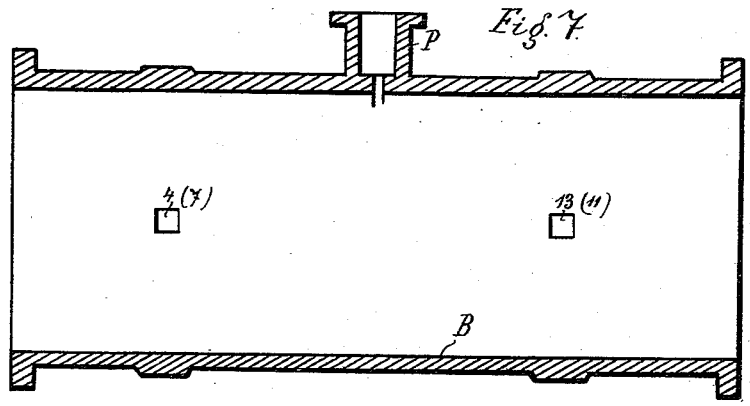
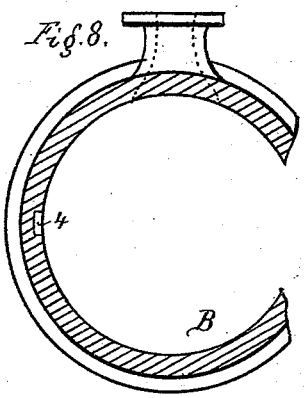
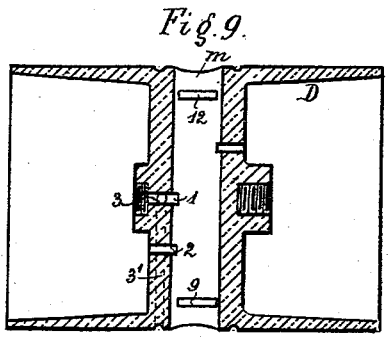
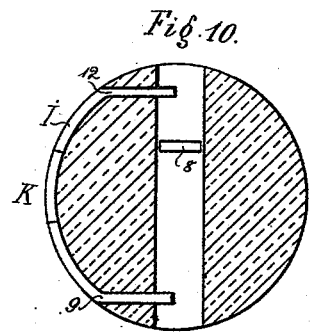
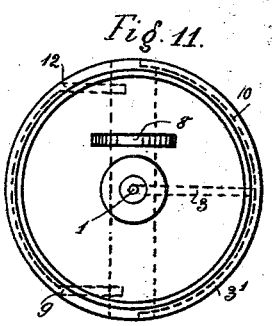
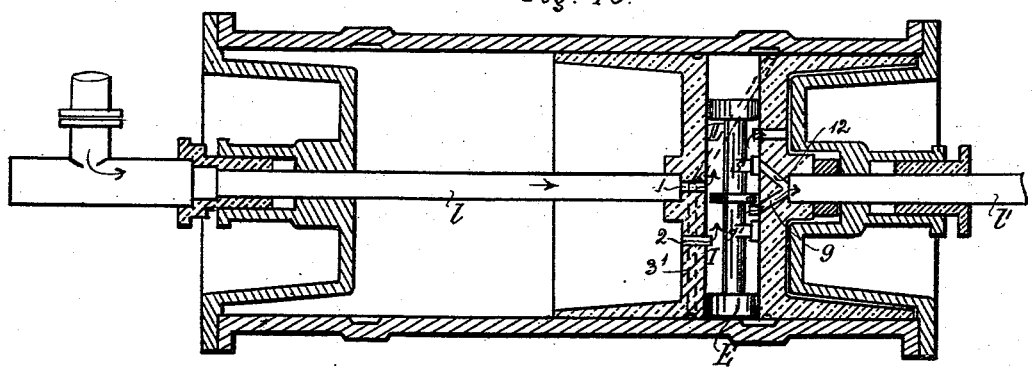
Witnesses:
H de Vos.
E. L. Richards.
Inventor:
Franz Jakob Laun,
By Richards &
Attorneys.

(No Model.) 6 Sheets—Sheet 4.
F. J. LAUN.
MOTOR.
No. 439,162. Patented Oct. 28, 1890.
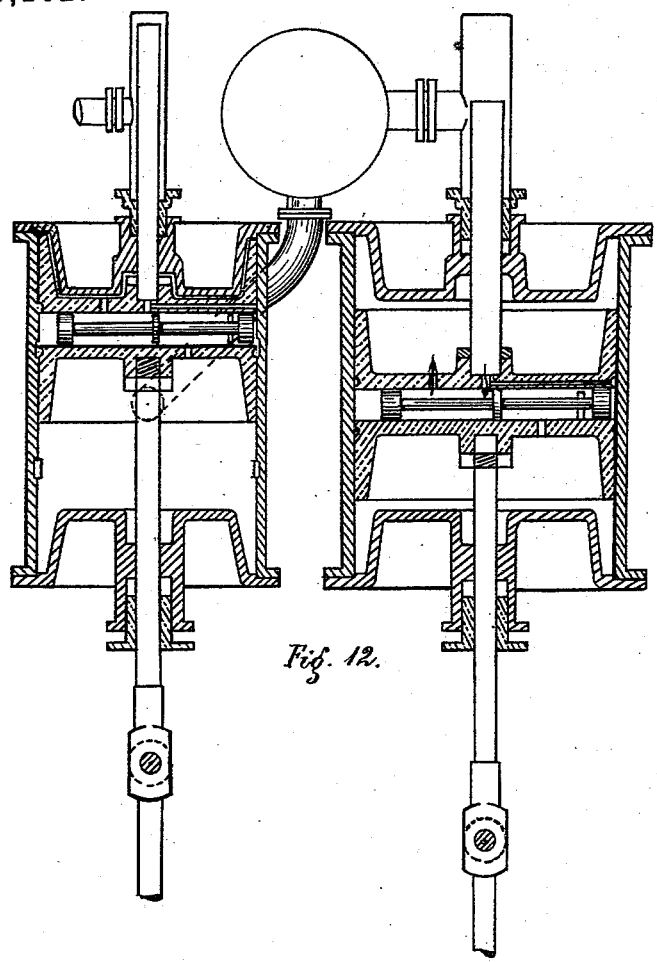
Fig. 12.
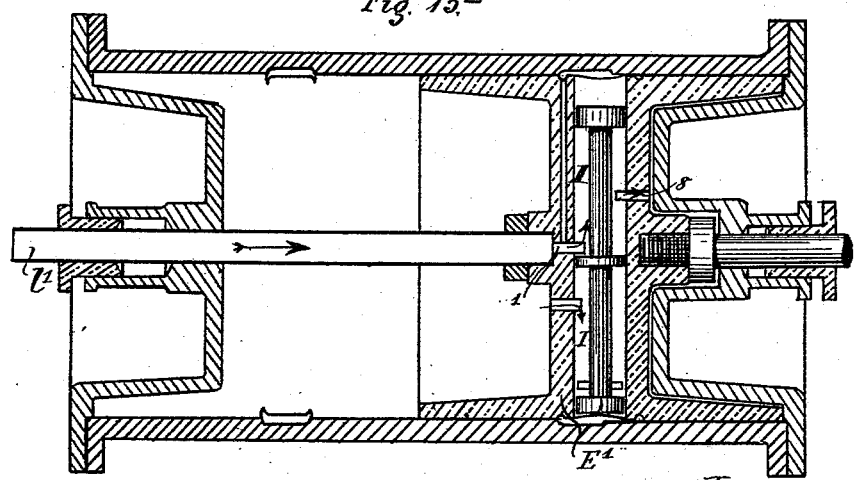
Fig. 13.ᵃ
Witnesses:
E. R. Brown
E. L. Richards
Inventor:
Franz Jakob Laun
By Richards & Co.
Attorneys.

(No Model.)  6 Sheets—Sheet 5.

F. J. LAUN.
MOTOR.

No. 439,162.  Patented Oct. 28, 1890.

Witnesses
H. de Vos.
E. L. Richards

Inventor:
Franz Jakob Laun
By Richards & Co.
Attorneys.

(No Model.) 6 Sheets—Sheet 6.
F. J. LAUN.
MOTOR.

No. 439,162. Patented Oct. 28, 1890.

Witnesses:
H. de Vos.
E. L. Richards

Inventor:
Franz Jakob Laun
By Richards
Attorneys.

UNITED STATES PATENT OFFICE.

FRANZ JAKOB LAUN, OF VILLINGEN, GERMANY.

MOTOR.

SPECIFICATION forming part of Letters Patent No. 439,162, dated October 28, 1890.

Application filed January 26, 1889. Serial No. 297,734. (No model.)

*To all whom it may concern:*

Be it known that I, FRANZ JAKOB LAUN, a subject of the Grand Duke of Baden, and a resident of the city of Villingen, in the Grand Duchy of Baden, German Empire, have invented certain new and useful Improvements in Motors; and I do hereby declare that the following is a full, clear, and exact description of the same.

This invention has for its object certain improvements in motors which are distinguished, essentially, by a peculiar arrangement of distributing slide-valve within the steam-piston itself, the steam-piston being furnished on the inside with the steam and exhaust ports and on the outside with flutings or grooves, which, in combination with shell-shaped cavities arranged on the inner wall of the cylinders, bring about the automatic return of the distributing slide-valve, and consequently the reversing of the movement of the piston. Since the distributing slide-valve is situated within the steam-piston and its movement is effected by the motion of the piston itself, the motor requires for its operation no valve-chest nor slide-valve rod and no special mechanism to transmit the motion of the piston to the slide-valve. A further and in practice very important advantage results directly from this—namely, the compact form of the motor and the simplicity of construction—and it may therefore be not only advantageously applied as a power-working machine, but also may be admirably adapted for the direct working of various kinds of machine-tools.

In the accompanying drawings, Figures 1 to 6, inclusive, show the invention applied to a steam-cylinder in various working positions and aspects, while Figs. 7 to 11, inclusive, show details of the same. In Figs. 12, 13, and 13ª the invention is shown adapted to Woolfschen and compound engines. Figs. 14 to 22, inclusive, show the invention applied as a direct-acting engine.

In the steam-cylinder B, Figs. 1, 7, and 8, which in construction only varies from the usual type of steam-cylinders in that there are ports 4, 7, 11, and 13, Figs. 1, 7, and 8, on the inside instead of the usual ports at each end, the piston D reciprocates. The piston D may be a solid cylinder, or for the sake of lightness may be solid only in the middle and elsewhere hollowed out. The piston-rod *l*, Fig. 1, which serves as a steam-pipe, passes from the steam-piston D through the cylinder-cover A to the steam-pipe G, Figs. 1, 2, and 3, which is connected with the gland of the stuffing-box, while the main piston-rod H, passing through the cylinder-cover A', is connected with the connecting-rod of the engine. The piston D is thus supported in the cylinder.

The distributing slide-valve E is a piston-valve of suitable construction, which intermittently reciprocates in the chamber *m* of the piston D.

The passage for the steam admission and exhaust, as well as the grooves, is placed in the steam-piston D or on its periphery. Supposing the piston D to have reached the end of a stroke to the left, the movable portions of the motor will assume the position shown in Fig. 1. The steam passes through from the feed-pipe G through the hollow piston-rod *l*, which is firmly fixed to the piston D, and into the piston itself by passing through the port 1 and reaches the chamber *m*. Thence it passes through the ports 2 to the front of the steam-piston D, so that the pressure of the steam now causes the latter to move toward the right, Fig. 2. As soon as the piston reaches the end of its stroke, Fig. 3, the groove 13 establishes a connection between the passage 3 (which is at right angles to the admission-port 1) and the upper end of the chamber *m*, in which the distributing slide-valve E oscillates. The steam therefore passes through the hollow piston-rod *l*, the port 1, the passage 3, and the groove 13 onto the piston of the distributing slide-valve E, so that the latter moves in a downward direction and takes up the position shown in Fig. 3, it being supposed that the steam which is contained in the chamber *m* beneath the said slide-valve can escape. This is effected by the groove 11, which establishes a connection between the groove 5 on the periphery of the piston D and a passage I, Figs. 4 and 6, which latter is also on the periphery of the piston D, and which carries the exhaust-steam to the exit. When the piston-valve E has assumed the position shown in Fig. 3, the entrance of the steam to the lower part of the chamber *m* is cut off. It therefore enters the upper part of the said chamber, which it fills, and passes through the channel 8 to the back of the piston D, so that the latter now commences its return-stroke. The piston D is thus impelled from right to left, and the steam in the lower end of the cylinder which impelled the piston toward the right must in consequence be permitted to escape. For this purpose there are ports 9 12, Figs. 3, 4, 9, and 10, in the piston D, which establish a communication with the groove I, Figs. 4 and 5, on the periphery of the piston. The groove I joins a second depression or groove K on the periphery of the piston, Figs. 5 and 6, lying parallel to the piston-rods, which, when the piston D oscillates, always remains in communication with the exhaust P in the wall of the cylinder B, Fig. 5. If the piston D moves to the left, the steam in the lower end of the cylinder escapes through channel 2 into chamber $m$, and from thence through port 9, and through the grooves I and K to the exhaust-port P.

Figure 3:
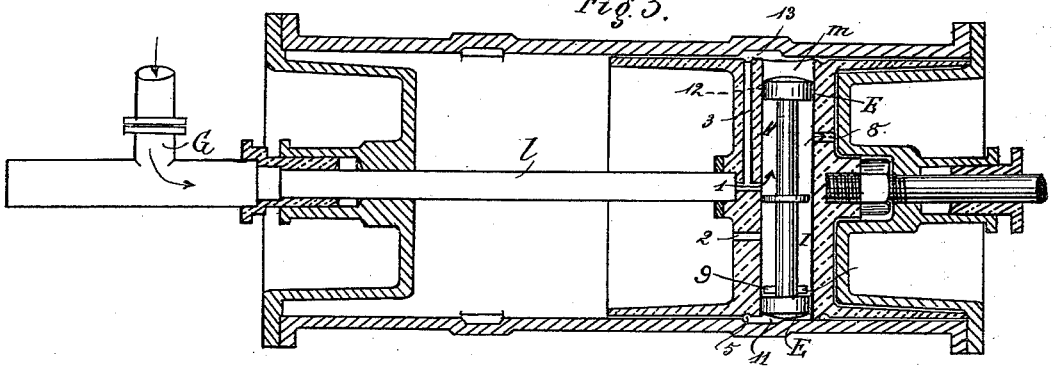
Figure 4:
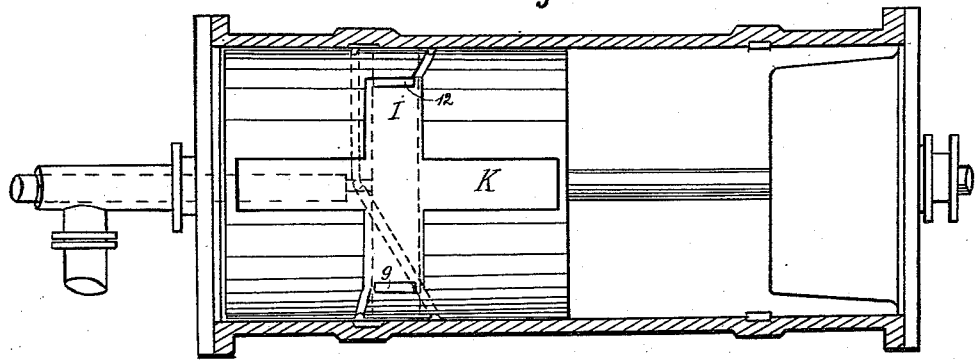
Figure 5:
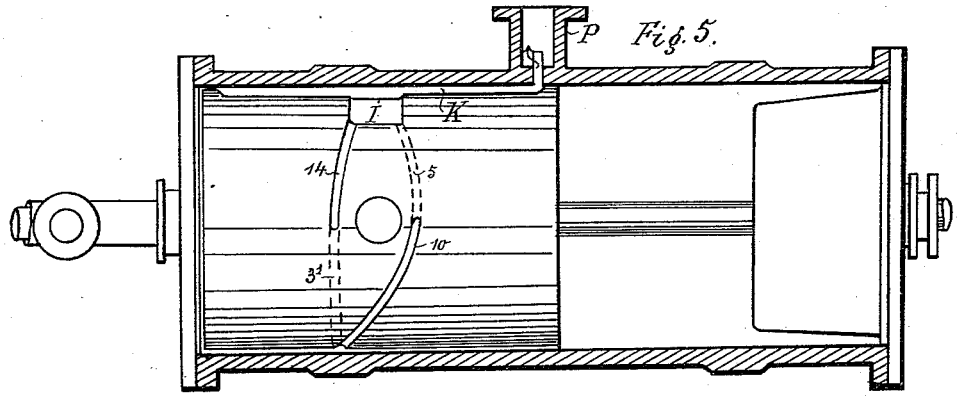
Figure 6:
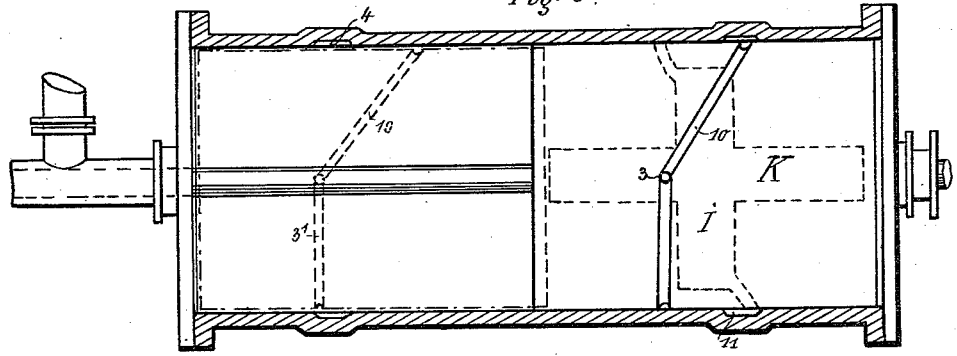
Figure 14:
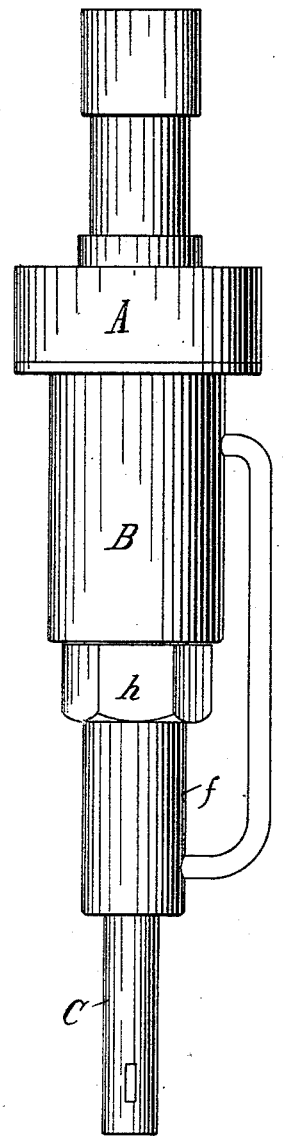

To enable the piston to make its return-stroke, the distributing slide-valve of course takes up the position shown in Fig. 3, as previously described, and does not move back till the piston D has again reached the bottom of the cylinder, as shown in Fig. 1. In this position the steam which flows through the passage 3 is enabled to pass along a groove 10, Fig. 6, (dotted lines,) which is curved, as shown on the periphery of the piston D, to the grooves 7 underneath the distributing slide-valve E, Fig. 1. The direct pressure of the steam thus returns the distributing slide-valve, while the steam which is on the top of it passes away through the exhaust P, Fig. 5, through groove 4 in the wall of the cylinder, groove 5, Figs. 1 and 5, and grooves I and K. The steam from the boiler then flows again, as above described, through the steam-port 1, chamber $m$, and channel 2 to the front of the piston D, and moves the said piston from left to right. The steam on the top of the piston passes away to exhaust through channel 8 to the upper end of chamber $m$, and thence through the port 12, which is now uncovered, and through the passages I and K to the exhaust-port P, Fig. 5. If the exhaust-steam is to be still further utilized, then two motors may be combined, as in the compound engine, as shown in Fig. 12, or as in the Woolfschen compound engine, as shown in Figs. 13 and 13$^a$. In the former arrangement there is no material variation in the construction, while in the second the distributing slide-valve E is furnished with special slide-surfaces $s$ $s'$ and with exhaust-ports 9 12. The exhaust-ports 9 12, Figs. 13 and 13$^a$, establish communication with the hollow piston $l'$, which forms the connecting piston-rod between the two pistons. If the two pistons E E' take up the position shown in Figs. 13 and 13$^a$, the steam passes through the hollow piston-rod $l$, port 1, upper end of the valve-chamber, and port 8 to the top of the high-pressure cylinder, and pushes the piston back, while the steam behind the piston E, which has already been used, passes away to exhaust through channel 2 and lower end of valve-chamber, and from thence through the port 9 into the hollow piston-rod $l'$. It then passes through port 1 of the low-pressure piston E', the valve-chamber, and the port 8, so that pressure is exerted on the top of the piston, and it is also moved toward the left simultaneously with the high-pressure piston.

Figure 15:
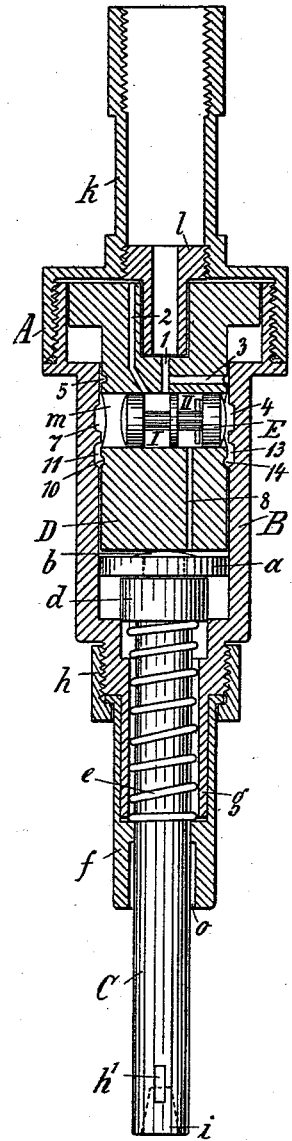
Figure 16:
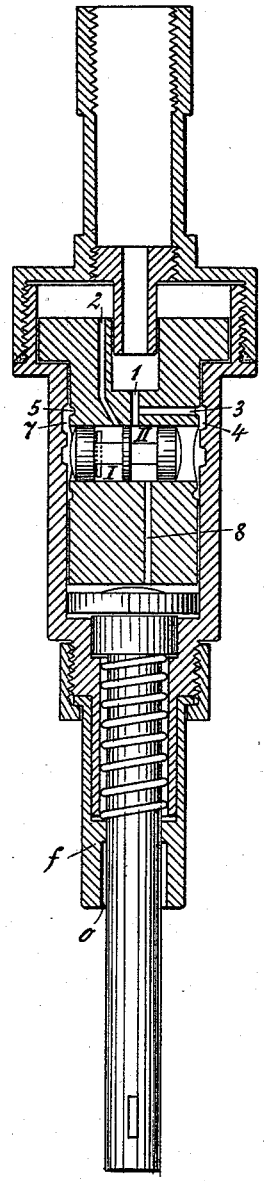

Hitherto the invention has been described in its application to power-engines; but on account of the small number of working parts and the simplicity of construction it may be used for imparting motion directly to a tool either attached to some other machine or held in the hand by the operator. This part of the invention is shown in Figs. 14 to 21, inclusive, as applied to a chisel, and in Fig. 22 to a drill. The chisel-tool consists of cylinder B, closed by the cover A, which incloses the motive mechanism and the chisel-holder C, to which the chisel is fastened in the ordinary manner. The motive mechanism inside the cylinder B consists, essentially, of the piston D, provided with ports and channels, and the distributing slide-valve E inside the piston. The said valve is a piston slide-valve of ordinary construction. The movable head $a$ of the holder C, from which the head, preferably rounded, projects, is inserted in the cylinder B. Underneath this plate $a$ there is a shoulder or neck $d$, against which a spiral spring $e$ presses, while the lower end of the spring rests against the face of the shoulder of the socket $f$. The socket $f$ is placed on the tubular neck $g$ of the cylinder B, and secured to the latter by means of the screwed cap $h$. The chisel itself, which is not shown in the drawings, is inserted in the taper hole $i$, bored in the end of the chisel-holder C, so that it sets itself firm by work, but can be again freed by forcing a pin or bar through the slot $h'$. The chisel-holder C and the chisel are thus raised by the spring $e$, when the force which drove it down is removed. Any suitable motive force may be provided—such, as for example, compressed air—as in the present examples. Naturally any other pressure medium may be applied instead of compressed air. If the separate parts are in the position shown in Fig. 15, the compressed air enters the piston, passing through the tubular neck $k$ of the cover A and through the small guide-tube $l$, screwed into the latter. The said guide-tube fits tightly a hole in the piston D, and from thence the channel 1 leads into the valve-chamber $m$, which is at right angles to the axis of the piston D, and in which the piston-valve E moves. The compressed air fills the end I of the chamber $m$, and passes upward through channel 2. Since the cylinder B is air-tight above the piston D, the latter is forced down, the passage 3 bored to meet the channel 1 reaches a groove or cavity 4 in the wall of the cylinder B so that the compressed air now passes through the pipe *l*, ports 1 and 3, and groove 4, and forces the distributing-valve E to the position shown in Fig. 16, provided that the air which is in front of the slide-valve, Fig. 15, can escape. This, however, takes place through the groove 5.

Figure 17:
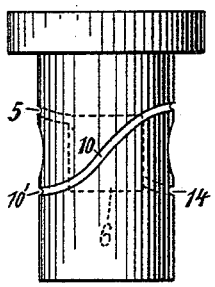
Figure 18:
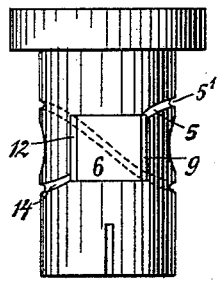
Figure 19:
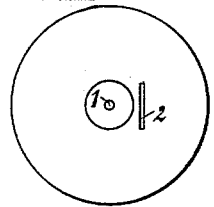
Figure 20:
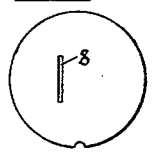
Figure 21:
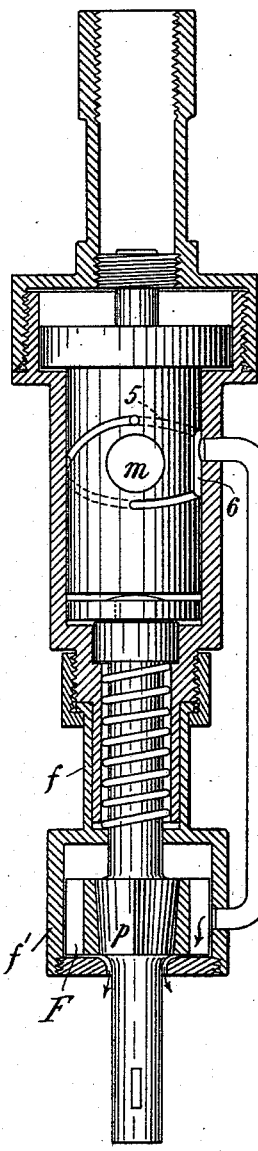

The commencement of groove 5' is opposite to the port 3 and opens into a space 6, Figs. 17, 18, and 21, in the side of the piston D, in front of which is the exhaust-pipe P in the wall of the cylinder. When the piston D descends, this groove 5' is placed in communication with the chamber *m* by means of the groove 7, which is formed in the wall of the cylinder and is opposite to groove 4, besides being placed in communication with the exhaust P, Fig. 21. Therefore the air which is in front of the distributing-valve E is permitted to escape to the exhaust through the cavity 7, grooves 5 5', and cavity 6 on the piston D when the valve E is moved to the left. The distributing-valve E is therefore, in consequence of the pressure of the air against the right-hand end of the same, moved to the left and takes up the position shown in Fig. 16. In this position the port 1 of the chamber *m* is shut off from the air-supply, and on the other hand the end 11 of chamber *m* is placed in communication with port 1, and thereby with the compressed-air supply, which thus fills the end of the valve-chamber and passes through the channel 8, by which it is led beneath the piston D and reverses the motion thereof. The air above the piston D, which has been cut off from the air-supply port 1, Fig. 16, resists the return movement and must therefore be permitted to escape. For this purpose a port 9 is provided, which, when the distributing slide-valve is in the position shown in Fig. 16, is uncovered and is in communication with port 2 and recess 6, Fig. 18, on the piston D. Supposing the compressed air to flow through the channel 8 and beneath the piston D to press the latter upward, the compressed air which is above the piston D escapes through channel 2, section 1 of chamber *m*, port 9, and recess 6 to exhaust P. The piston D thus takes up again the position shown in Fig. 15, whereupon the distributing slide-valve moves from the position shown in Fig. 16 to that shown in Fig. 15. This change in position from left to right takes place in precisely the same manner as that from right to left, hereinbefore described. From the port 3 the groove 10 passes in the direction indicated on Fig. 17 to the opposite side of the piston D, beneath the valve-chamber *m*, where it terminates. When the piston D is raised, the end 10' of the groove 10 is placed in communication, by means of the groove 11 in the wall of the cylinder B, with section 1 of the chamber *m*, so that now the compressed air passes through port 1 and passage 3 and reaches the groove 10, Fig. 17, where it flows half round the piston D, reaches (through the groove 11, Fig. 15) the front of the valve E, and forces the latter back again from left to right, as shown in Fig. 15. Section 11 of chamber *m* is cut off from communication with the compressed air while communication with I is restored, so that the air again issues above the piston D, passing through channels 1 and 2. In this position the left-hand piston of the valve E covers the exhaust-port 9. The piston D is therefore forced down, whereupon the air, which is beneath the piston, returns through channel 8 to section 11 of chamber *m*, and from here escapes through port 12, Fig. 18, and so to the exhaust. The air which was behind the valve, and which would otherwise prevent the latter moving to place the ports 1 and 2 in communication, escapes through the groove 13, Fig. 15, which establishes communication by means of the groove on the circumference of the piston D with the cavity 6, and consequently the exhaust-pipe. The ingress and egress of compressed air is thus regulated, so as to produce a reciprocating motion of the piston.

The chisel-holder C, as heretofore described, is arranged beneath the piston D and inclosed in a spring in such a manner that it will rise as soon as the pressure on it is removed. The holder receives as many blows or strokes in one minute as the piston D makes backward motions in the same period of time. When the operator has ascertained from the effect of the first few blows the requisite amount of force to be applied, he need only guide the chisel along the lines indicated, and at those points where he may desire the chisel to cut deeper cause the chisel to operate on those points until the desired effect has been produced. Since the operator does not himself strike the chisel, he may easily and safely guide the latter along the material which is being operated upon, and the most intricate lines can be followed with the greatest accuracy.

As before described, the exhaust-air escapes through the opening P in the cylinder B. The air which in this arrangement escapes without further utility might be made use of for blowing away the dust or chips produced, so that the lines to be chiseled out can always be clearly seen or followed by the operator. Furthermore, this exhaust-air may be made use of to cool the chisel, and also, with a slight alteration in the cap *f*, to rotate the rod C to enable holes to be chiseled or drilled. With these objects in view a tube R leads from the exhaust P to the lower part of the cap *f* and ends in a hole *n* therein, which hole joins an annular space *o*, in which the chisel-holder C moves. The escaping air thus passes through the small tube R and the hole *n* to the lower part of the cap and the chisel-holder C, along and around which it is conducted by the annular space *o* and flows down to the chisel-point which is in operation and blows away the dust that is here produced by the action, for example, of the chisel upon the stone. The air plays round the blade and it is thereby cooled or any overheating avoided.

Figure 22:
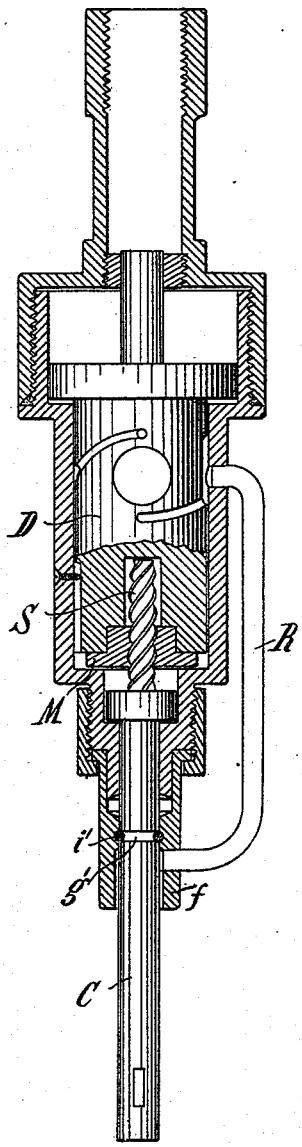

When the escaping air is employed for rotating the cutting-blade, the lower part of the cap $f$, Fig. 21, is provided with a head $f'$. The chisel-holder C is four-sided at $p$, and on this is placed a small winged wheel F, provided with a four-sided bore. Now, if the same apparatus is to be employed for chiseling holes which has before been described for straight chiseling, the screwed cap $h$, Figs. 15 and 16, is loosened, the cap $f$, Figs. 14 and 16, removed, and, instead of it, a cap provided with a head $f'$, Fig. 21, is screwed on, within which head the winged wheel F is inclosed. The exhaust-air then issues against the wings F and sets them in motion, and as they are keyed onto the four-sided collar $p$ the said chisel-holder and the chisel also rotate therewith during the reciprocating motion of the piston. A circular hole may thus be made in the material. The exhaust-air flows down, as before, from the cap $f$, so that the dust formed during the operation is blown away. A further application for the direct working of a drill is shown in Fig. 22.

The drill-holder C is held in the cap $f$ by means of a circular groove $g'$ in the circumference thereof, into which a ring $i'$ is inserted, so that the holder can revolve, but cannot be displaced vertically. At the top end of the holder C is a quick-threaded screw S, which penetrates a hole in the piston D and receives the nut M. If the piston D is vibrated vertically, the drill is made to rotate by means of the motion of the nut M on the screw S.

The compressed air required for the work may be generated in the case of heavy or extensive works by a special power machine, or in the case of light or smaller works by the ordinary india-rubber ball. In the latter case the operator holds the apparatus with the right hand against the point where the cutting is to be effected, while with the left hand he squeezes the india-rubber ball, and thereby supplies the air-pressure required for the work.

What I claim as new, and desire to secure by Letters Patent, is—

1. In a motive-power engine, the combination of the cylinder, the piston D, and the distributing-valve E, said piston having the longitudinal ingress-port 1, the lateral passage 3, the peripheral groove 10, and the several ingress and exhaust passages 2, 8, 9, and 12, and the external groove I and longitudinal depression K, and said cylinder having the lateral exhaust P and the internal grooves 4, 7, 11, and 13, substantially as set forth.

2. The combination, with the piston and cylinder, of a tool-holder having a winged wheel outside the cylinder, an inclosing-chamber, and an air-conduit leading from the exhaust to said chamber, substantially as set forth.

3. In a motive-power engine, the combination of the cylinder, the piston, and the distributing-valve, said piston having steam-admission passages controlled by said valve, and external grooves, and said cylinder having internal grooves adapted to connect and co-operate with the grooves of the piston to control the valve and effect the exhaust, substantially as set forth.

In witness whereof I have hereunto set my hand in presence of two witnesses.

FRANZ JAKOB LAUN.

Witnesses:
ALEX SCHOLZE,
B. ROI.